(12) United States Patent
Pai

(10) Patent No.: US 10,405,700 B2
(45) Date of Patent: Sep. 10, 2019

(54) GRINDER

(71) Applicant: Chung-Jen Pai, New Taipei (TW)

(72) Inventor: Chung-Jen Pai, New Taipei (TW)

( * ) Notice: Subject to any disclaimer, the term of this patent is extended or adjusted under 35 U.S.C. 154(b) by 394 days.

(21) Appl. No.: 15/287,699

(22) Filed: Oct. 6, 2016

(65) Prior Publication Data

US 2017/0258272 A1    Sep. 14, 2017

(30) Foreign Application Priority Data

Mar. 9, 2016    (CN) .......................... 2016 2 0180117
Aug. 15, 2016   (TW) .............................. 105212370 U

(51) Int. Cl.

| *A47J 42/50* | (2006.01) |
|---|---|
| *A47J 42/00* | (2006.01) |
| *A47J 42/10* | (2006.01) |
| *A47J 42/40* | (2006.01) |
| *A47J 42/06* | (2006.01) |
| *A47J 42/02* | (2006.01) |
| *A47J 42/42* | (2006.01) |

(52) U.S. Cl.
CPC .............. *A47J 42/50* (2013.01); *A47J 42/00* (2013.01); *A47J 42/02* (2013.01); *A47J 42/06* (2013.01); *A47J 42/10* (2013.01); *A47J 42/40* (2013.01); *A47J 42/42* (2013.01)

(58) Field of Classification Search
CPC .. A47J 42/00; A47J 42/02; A47J 42/06; A47J 42/10; A47J 42/42; A47J 42/50
USPC ............................................ 241/169.1, 261.1
See application file for complete search history.

(56) References Cited

U.S. PATENT DOCUMENTS

| 5,865,384 A  * | 2/1999 | Pai .......................... | A47J 42/02 |
|---|---|---|---|
|  |  |  | 241/101.3 |
| 2010/0187343 A1* | 7/2010 | Stasin ..................... | A47J 42/04 |
|  |  |  | 241/169.1 |

FOREIGN PATENT DOCUMENTS

| TW | 367805 | 8/1999 |
|---|---|---|
| TW | 415215 | 12/2000 |

\* cited by examiner

*Primary Examiner* — Shelley M Self
*Assistant Examiner* — Bobby Yeonjin Kim
(74) *Attorney, Agent, or Firm* — Guice Patents PLLC

(57) ABSTRACT

A grinder comprises: a receiving container, formed with an accommodation space and an installation space, and the bottom end thereof being extended with a connection ring have a feeding port, and a hollow grinding seat and a fasten ring are respectively and detachably disposed in the feeding port and the connection ring; an electric driving device, detachably disposed in the installation space; and a base, detachably disposed at the bottom end of the receiving container and including a hollow grinding chamber having the interior disposed with a support member with a pivotal shaft, a passive rod is sleeved and linked with a conical grinding disk, the top end and the bottom end of the passive rod are respectively sleeved with the output shaft and the pivotal shaft, thereby allowing the grinding disk to protrude into the grinding seat and forming a gap between the above two.

13 Claims, 10 Drawing Sheets

GRINDER

BACKGROUND OF THE INVENTION

1. Field of the Invention

The present invention relates to a grinder, especially to a grinder allowing an electric driving device to be individually removed for processing a water cleaning operation to other components.

2. Description of Related Art

Foods in a powder or a particle shape is commonly used in our daily lives, such as pepper powders and curry powders being used as spices or added in beverages, the particle-shaped or sheet-like solid member is ground into powders for being easily dissolved and evenly distributed in foods or liquid.

There are two types of conventional grinders, one is manual and the other is electric, the particle-shaped or sheet-like foods is disposed in the grinder, and a manual or an electric means is adopted for directly grinding the particle-shaped or sheet-like foods into powders so as to be sprinkled in foods or soup, such freshly grinding right before using is one of the favorite means for users and chefs. Taiwan Patent No. 367805 and Taiwan Patent No. 415215 (corresponding to U.S. Pat. No. 5,865,384) both granted to the applicant of the present invention have respectively disclosed an electrical grinder and a manual grinder, in which the interior of a hollow housing formed in the grinder is served to accommodate the objects to be ground, such as pepper particles, and the top end of the housing is provided with a driving device, such as an electrically powered device or a manual rotating seat. As such, before the objects to be ground are desired to be disposed in the housing, the driving device has to be removed firstly, and the above-mentioned operation brings a lot of inconveniences.

If the objects to be ground are coffee beans, the particle size thereof is relatively large and the beans would become harder after being baked, when a conventional manual grinder is adopted and a manual force is applied for grinding the beans for obtaining a proper amount of powders, the wrist or the arm of a user may feel tired. One advantage of the manual grinder is that a slow grinding means (low rotation speed) is adopted for grinding coffee beans, so that the oxidizing speed can be reduced for allowing the brewed coffee to be provided with rich aroma.

As such, the electric grinder is the main stream in the grinder market, one advantage of the electric grinder is that the grinding speed is fast and coffee can be brewed right after the fast grinding. However, one disadvantage of the electric grinder is that the coffee beans are ground in almost 1,000 RPM (high rotation speed), so during the grinding process, heat generated by a grinding disk and a grinding seat served as a grinding device would be transferred to the coffee beans, so that the ground powders will be overly oxidized because of the raised temperature, and the rich aroma would be lost.

Especially, the electric driving device of the electric grinder is disposed in the machine body, and the grinding disk and a pulling sheet are fastened on an output shaft of the electric driving device, the grinding seat is fastened in the machine body, such as at the bottom end of a receiving container, thereby difficult to be detached. Because the coffee bean contains oil, the ground powders would be easily adhered on the grinding disk, the grinding seat and the pulling sheet, the user can use a brush for cleaning only partial areas (it is hard to clean all areas) of the grinding disk, the grinding seat and the pulling sheet can be brushed for cleaning, so a complete cleaning operation for removing the adhered powders is hard to be processed. Especially, the gap between the grinding disk and the grinding seat is a blind corner where the brush is unable to reach for the purpose of cleaning, so after the adhered powders are oxidized, odor may be generated which causes a hygiene issue, and the bad smell is unpleasant for consumers; accordingly, the above-mentioned disadvantages shall be improved.

SUMMARY OF THE INVENTION

One primary objective of the present invention is to provide a grinder, through changing the space arrangement of a receiving container, an electric driving device is able to be disposed at one side of the receiving container, so that the electric driving device can be individually detached and other components such as the receiving container, a grinding seat, a grinding disk and a base are able to be processed with a comprehensive water cleaning operation, thereby avoiding issues of powder adhering and odor generating, and hygiene and health are provided.

For achieving said objectives, one technical solution provided by the present invention is to provide a grinder, which comprises a receiving container, the interior thereof is radially disposed with a partition plate for axially forming an accommodation space allowing objects to be ground to be accommodated and an installation space, the bottom end of the receiving container is extended with a connection ring having a feeding port, and the bottom end of the installation space is formed with a through hole aligned with the feeding port; a hollow grinding seat and a fasten ring are respectively and detachably disposed in the feeding port and the connection ring; an electric driving device, detachably disposed in the installation space and including a power switch coupled to a power input socket and a motor, and a deceleration mechanism is driven by the motor, an output shaft of the deceleration mechanism is received in the through hole; and a base, detachably disposed at the bottom end of the receiving container and having a hollow grinding chamber, the interior of the grinding chamber is disposed with a support member having the top surface formed with a pivotal shaft, the support member is connected to an inner wall of the grinding chamber through at least two wing sheets, and at least one discharging port is formed between the wing sheets, a passive rod is sleeved with a conical grinding disk linked with the passive rod, the top end and the bottom end of the passive rod are respectively sleeved with the output shaft and the pivotal shaft, thereby allowing the grinding disk to protrude into the grinding seat and forming a gap between the above two; the passive rod is able to be rotated with the output shaft, and the grinding disk is able to be synchronously driven to perform a grinding operation in the grinding seat.

For achieving said objectives, one technical solution provided by the present invention is to provide a grinder, which comprises a receiving container, the interior thereof is radially disposed with a partition plate for axially forming an accommodation space allowing objects to be ground to be accommodated and an installation space, the bottom end of the receiving container is extended with a connection ring having a feeding port, and the bottom end of the installation space is formed with a through hole aligned with the feeding port; and an elevation ring connected to the bottom end of an adjustment ring, the adjustment ring is disposed with a rotation ring at the location adjacent to the bottom surface of the receiving container, the elevation ring is only able to be axially moved in the feeding port through being guided by a guiding mechanism, the bottom end of a material guiding ring is protruded from the bottom surface of the feeding port and connected to the top end of the elevation ring, a hollow grinding seat and a fasten ring are respectively and detachably disposed in the elevation ring and the connection ring; an electric driving device, detachably disposed in the installation space and including a power switch coupled to a power input socket and a motor, and a deceleration mechanism is driven by the motor, an output shaft of the deceleration mechanism is received in the through hole; and a base, detachably disposed at the bottom end of the receiving container and having a hollow grinding chamber, the interior of the grinding chamber is disposed with a support member having the top surface formed with a pivotal shaft, the support member is connected to an inner wall of the grinding chamber through at least two wing sheets, and at least one discharging port is formed between the wing sheets, a passive rod is sleeved with a conical grinding disk linked with the passive rod, the top end and the bottom end of the passive rod are respectively sleeved with the output shaft and the pivotal shaft, thereby allowing the grinding disk to protrude into the grinding seat and forming a gap between the above two; the passive rod is able to be rotated with the output shaft, and the grinding disk is able to be synchronously driven to perform a grinding operation in the grinding seat; when the rotation ring is rotated, the elevation ring is axially moved along the bottom end of the adjustment ring, and the grinding seat, the fasten ring and the material guiding ring are synchronously driven to be moved towards upward/downward for adjusting the dimension of the gap.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Referring from FIG. 1 to FIG. 5, the present invention provides a grinder, which comprises a receiving container 1, an electric driving device 2 and a base 3.

Figure 1:
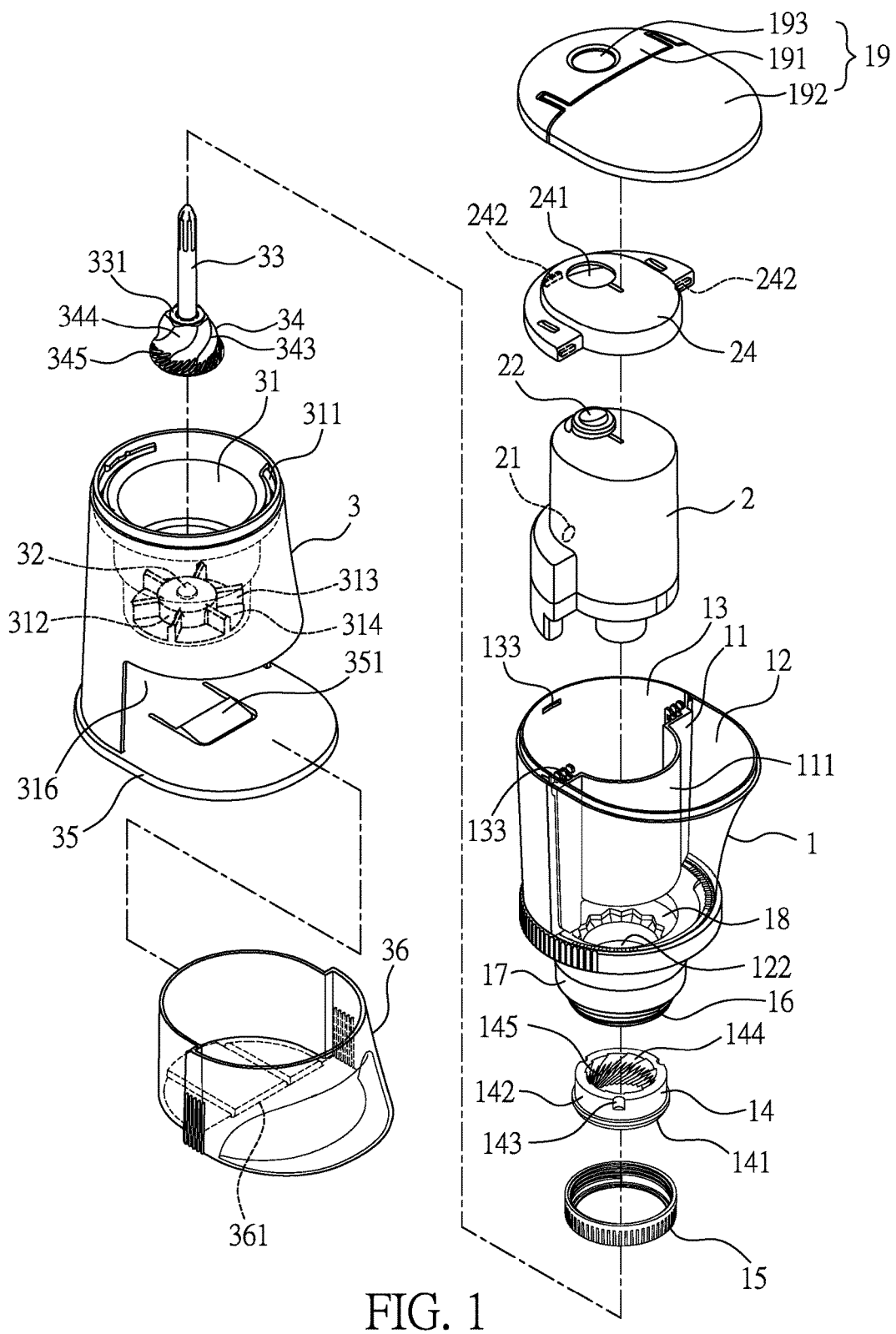
FIG. 1 is a perspective exploded view illustrating the grinder according to the present invention.
Figure 2:
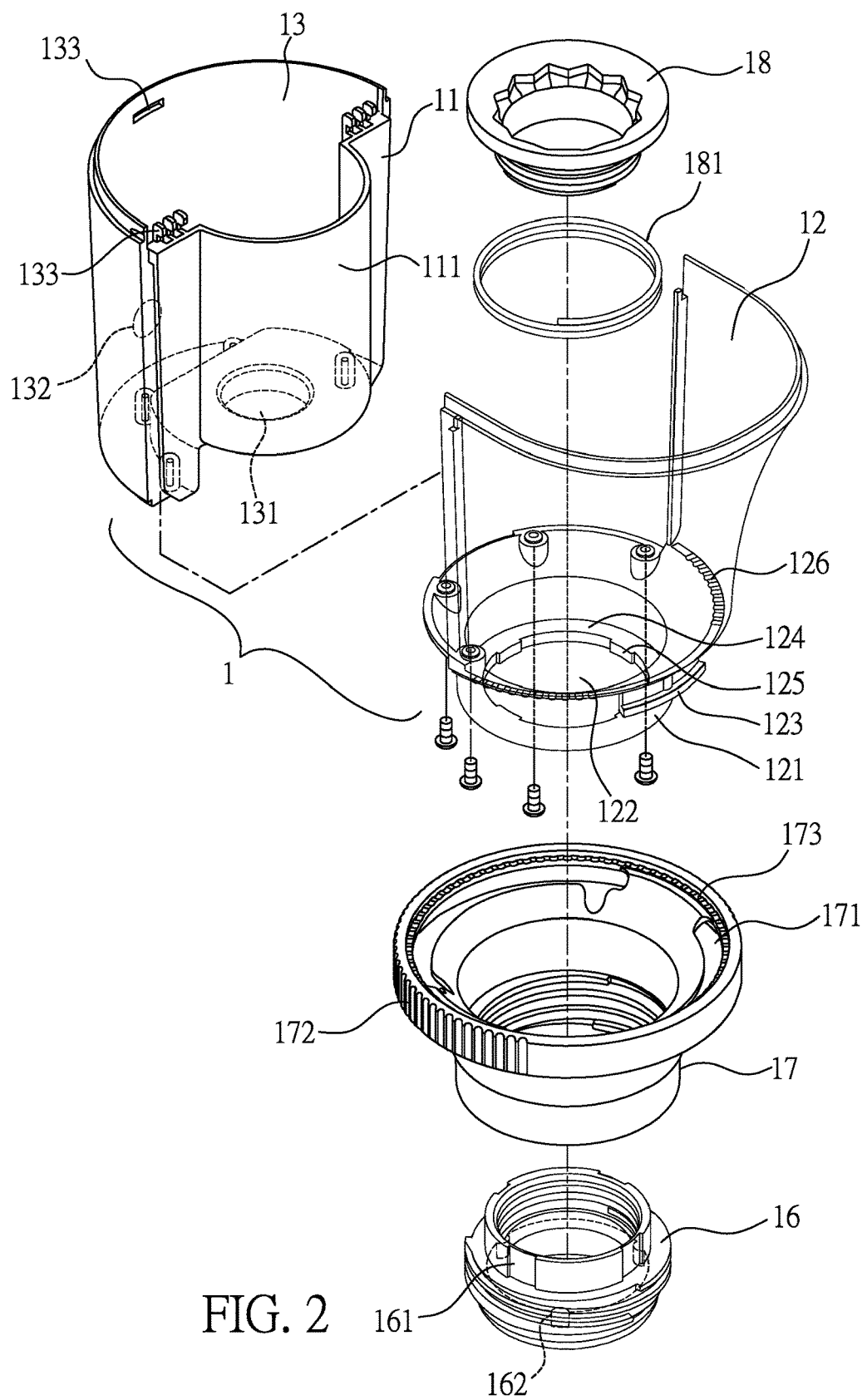
FIG. 2 is a perspective exploded view illustrating the receiving container shown in FIG. 1 according to the present invention.
Figure 5:
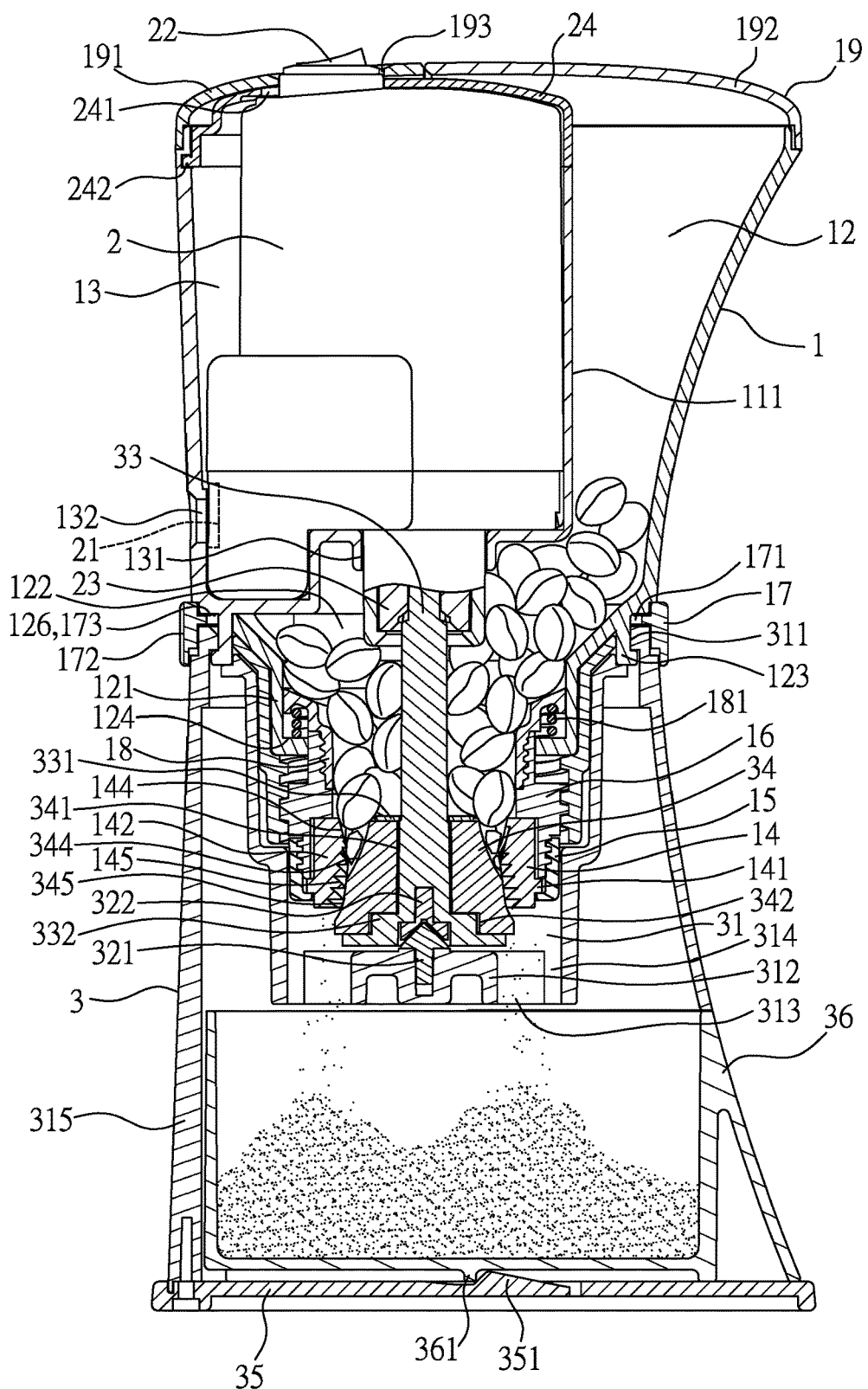
FIG. 5 is a cross sectional view illustrating the assembly of the grinder shown in FIG. 4 according to the present invention.
Figure 6:
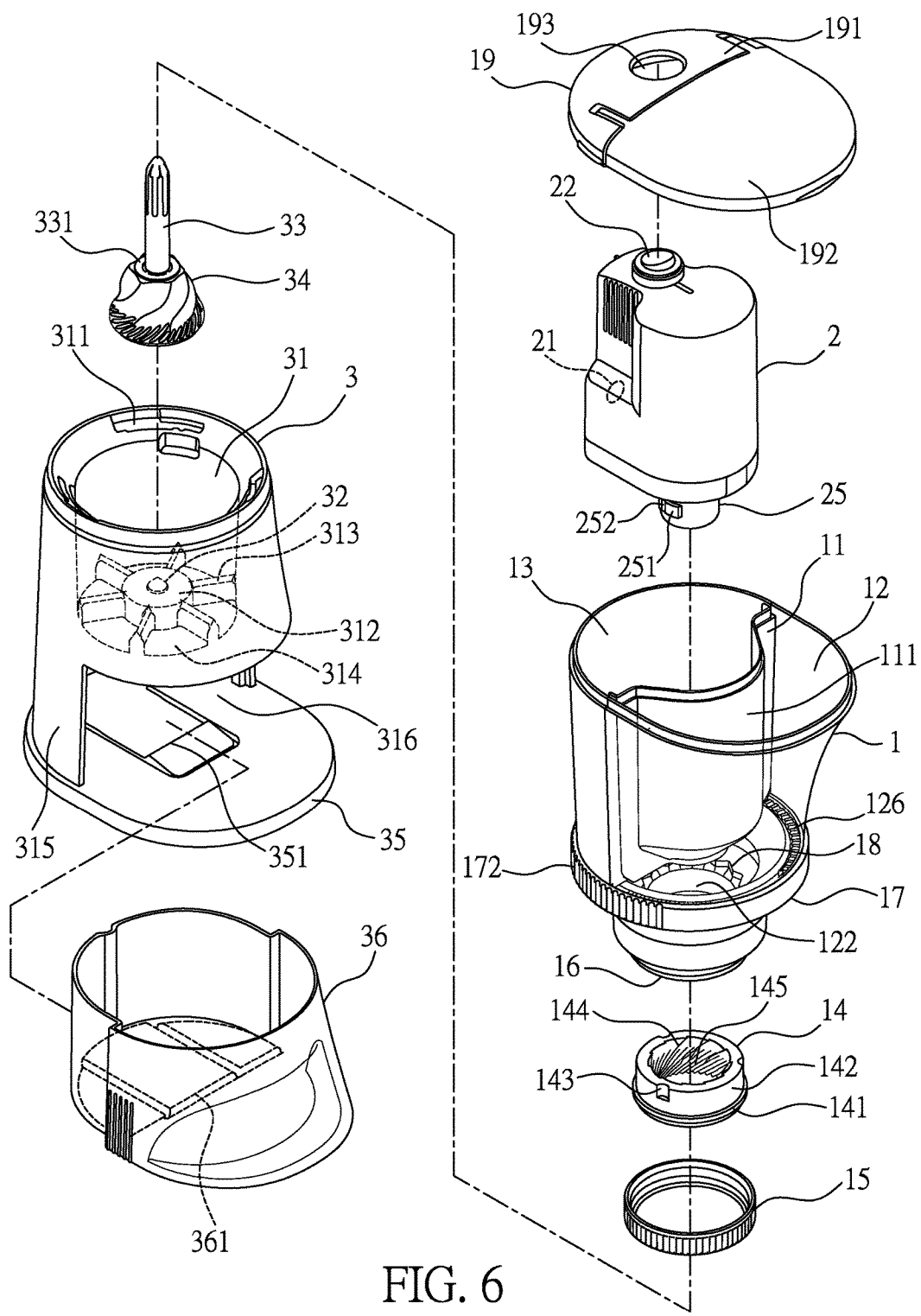
FIG. 6 is a perspective exploded view illustrating the grinder according to another embodiment of the present invention.

As shown in FIG. 1, FIG. 2 and FIG. 5, the receiving container 1 is formed as a hollow body, and the interior thereof is radially disposed with a partition plate 11, thereby axially forming an accommodation space 12 allowing objects to be ground to be accommodated and an installation space 13 allowing the electric driving device 2 to be installed therein. Wherein, the accommodation space 12 is preferably to be in a transparent status, so that a function of observing the objects to be ground, such as the amount of coffee beans, can be easily achieved. The bottom end of the receiving container 1 is axially extended with a connection ring 121 having a feeding port 122, and the circumference defined at the bottom end of the receiving container 1 is radially protruded with at least two buckle hooks 123 (as shown in FIG. 2 and FIG. 5), so that at least two buckle hooks 123 are able to be inserted in and buckled with at least two buckle slots 311 correspondingly formed on the base 3, thereby enabling the receiving container 1 and the base 3 to be combined or detached.

The accommodation space 12 and the installation space 13 are respectively formed as a shell body, and the shell bodies are engaged then connection members, such as screws, are served to pass the installation space 12 and to be fastened on the bottom surface of the installation space 13. Wherein, the bottom end of the installation space 13 is formed with a through hole 131 aligned with the feeding port 122 (as shown in FIG. 2 and FIG. 5).

For providing a grinding function, according to the first embodiment of the present invention, a hollow grinding seat 14 is disposed in the feeding port 122 and a fasten ring 15 is combined, such as screwed, with the connection ring 121, so that the grinding seat 14 is able to be fastened in the feeding port 122. In other words, the grinding seat 14 and the fasten ring 15 can be individually detached from the feeding port 122 and the connection ring 121 for the purpose of processing a cleaning operation.

For providing functions of grinding and adjusting the particle size of powder, according to the second embodiment of the present invention, an elevation ring 16 is connected, such as screwed, to the inner circumference defined at the bottom end of a hopper-like adjustment ring 17, then the adjustment ring 17 is arranged to be adjacent to the bottom end of the receiving container 1, so that the buckle hooks 123 are able to pass at least two seat slots 171 preformed on the top surface of the adjustment ring 17. For enabling the elevation ring 16 to only be axially moved in the feeding port 122, a guiding mechanism is disposed between the above two, the guiding mechanism includes a plurality of guiding slots 161 and a plurality of guiding columns 125 correspondingly formed on the outer circumference defined at the top end of the elevation ring 16 and the inner circumference of an inner flange 124 on the bottom surface of the feeding port 122 and capable of being mutually sleeved with each other.

In addition, an elastic member 181, such as a spring, is sleeved at the bottom end of a material guiding ring 18, then the bottom end of the material guiding ring 18 is protruded from the bottom surface of the feeding port 122 and connected, such as screwed, to the inner circumference defined at the top end of the elevation ring 16, so that the elastic member 181 is disposed between the material guiding ring 18 and the inner flange 124, thereby allowing the material guiding ring 18 to be provided with a function of axially and elastically moving.

Lastly, the grinding seat 14 is sleeved in the elevation ring 16, and the fasten ring 15 is connected, such as screwed, to the outer circumference defined at the bottom end of the elevation ring 16, thereby allowing to grinding seat 14 to be fastened in the elevation ring 16. In other words, the grinding seat 14 and the fasten ring 15 can be individually detached from the elevation ring 16 and the connection ring 15 for the purpose of processing a cleaning operation. The top end of the adjustment ring 17 is disposed with a rotation ring 172 arranged to be adjacent to the receiving container 1, and adjacent surfaces of the receiving container 1 and the rotation ring 172 are correspondingly disposed with a fixed teeth ring 126 and a moveable teeth ring 173 (as show in FIG. 5) capable of being mutually engaged with each other. As such, when a user rotates the rotation ring 172, the elevation ring 16 connected at the bottom end thereof can only be axially moved along the inner circumference defined at the bottom end of the adjustment ring 17 due to the guiding effect provided by the guiding slots 161 and the guiding columns 125 of the feeding port 122, and the grinding seat 14, the fasten ring 15 and the material guiding ring 18 can also be synchronously driven to be axially moved towards upward/downward, thereby forming a linking relation.

The bottom end of the grinding seat 14 is formed with a seat edge 141 having a relatively larger dimension and abutted against the fasten ring 15, the top end of the seat edge 141 is disposed with a grinding tube 142 having a relatively smaller outer diameter. According to the first embodiment, the outer circumference of the grinding tube 142 of the grinding seat 14 is formed with a plurality of positioning slots 143 so as to be disposed in the feeding port 122 and inserted by a plurality of position columns (not shown in figures) which are correspondingly disposed, thereby enabling the grinding seat 14 to be fastened in the feeding port 122 and unable to rotate therein. According to the second embodiment, the outer circumference of the grinding tube 142 of the grinding seat 14 is formed with a plurality of the positioning slots 143 so as to be disposed in the elevation ring 16 and inserted by a plurality of positioning columns 162 which are correspondingly disposed, thereby enabling the grinding seat 14 to be fastened in the elevation ring 16 and unable to rotate therein. Moreover, the top end defined on the inner circumference of the grinding tube 142 is annularly formed with a plurality of inclined guiding ribs 144, and the bottom end thereof is annularly formed with a plurality of grinding teeth 145 with a lot of inclined teeth compactly arranged.

As such, according to the second embodiment, the buckle hooks 123 at the bottom end of the receiving container 1 are able to pass the seat slots 171 on the top surface of the adjustment ring 17 then inserted in and buckled with the buckle slots 311 of the base 3, thereby allowing the receiving container 1 and the base 3 to be combined or detached.

The electric driving device 2 is modularized to be formed as a unit, and includes a power switch 22 coupled to a power input socket 21 and a motor, such as a DC motor (commonly known as prior art therefore not shown in figures), and a deceleration mechanism (commonly known as prior art therefore not shown in figures) is driven by the motor, an output shaft 23 (shown in FIG. 5) of the deceleration mechanism is received in the through hole 131. As such, when electric power is obtained through the power input socket 21 and the power switch 22 is served to perform a switching operation, the motor is able to operate and the deceleration mechanism can be served to decelerate, thereby enabling the decelerated power to be outputted through the output shaft 23. According to actual tests, the rotation speed of the output shaft 23 is 70 to 90 RPM (revolution per minute), and preferably to be 80 RPM. As such, the electric driving device 2 can be provided with a slow grinding effect with low rotation speed, so that the objects to be ground, such as coffee powders, can be prevented from being overly oxidized during the grinding process.

Wherein, the power input socket 21 is disposed at the outer side of the electric driving device 2, and the installation space 13 is formed with a penetrated hole 132 corresponding to the location of the power input socket 21. Moreover, the power input socket 21 allows a household power input plug or a power input plug of a vehicle-used adapter to be inserted for obtaining electric power. In other words, the grinder cannot only be used indoor, but also can be used outdoor through obtaining the electric power from the vehicle-used adapter installed in a car or a motorbike, thereby expanding the applicable range. Furthermore, the power switch 22 is preferably to be disposed on the top surface of the electric driving device 2 for providing operation convenience to the user.

Especially, the center of the partition plate 11 is formed with a convex arc part 111, so that the installation space 13 and the electric driving device 2 are both formed in a mushroom-like shape, thereby avoiding a false inserting situation. For preventing the electric driving device 2 from being axially released from the installation space 13, the electric driving device 2 further includes a seal cover 24 which is detachable relative to the installation space 13, the seal cover 24 is formed with a key hole 241 corresponding to the location of the power switch 22 and allowing the power switch 22 to be exposed, and adjacent surfaces of the electric driving device 2 and the top end of the installation space 13 are correspondingly formed with at least one latch hook 242 and at least one latch slot 133 cable to be mutually latched with each other, so that the seal cover 24 can be served to seal an opening at the top end of the installation space 13, and the electric driving device 2 can be stably disposed in the installation space 13.

Furthermore, the working voltage and the working current of the electric driving device 2 is 12 voltage and 2 ampere, the consumption power is 24 watt, so a function of saving electric power is provided; because the DC power is adopted, a situation of electric shock caused by a child accidentally touching can be avoided, and effects of environmental friendly and power saving are also provided.

For preventing an foreign object from falling into the accommodation space 12, an opening at the top end of the receiving container 1 is disposed with a top cover 19, and the top cover 19 includes a fasten cover 191 located above the seal cover 24, the fasten cover 191 is radially pivoted with a lift cover 192 located above the accommodation space 12, the lift cover 192 is able to be lifted relative to the accommodation space 12 for allowing the objects to be ground to be replenished and able to be recovered for shielding an opening at the top end of the accommodation space 12. Wherein, the fasten cover 191 is formed with a cover hole 193 corresponding to the location of the power switch 22 and allowing the power switch 22 to be exposed, so an effect of convenient in operation is provided. When the lift cover 192 is lifted and positioned, an inner edge thereof is abutted against the power switch 22 so as to cut off the electric power for stopping the operation of the electric driving device 2.

Figure 3:
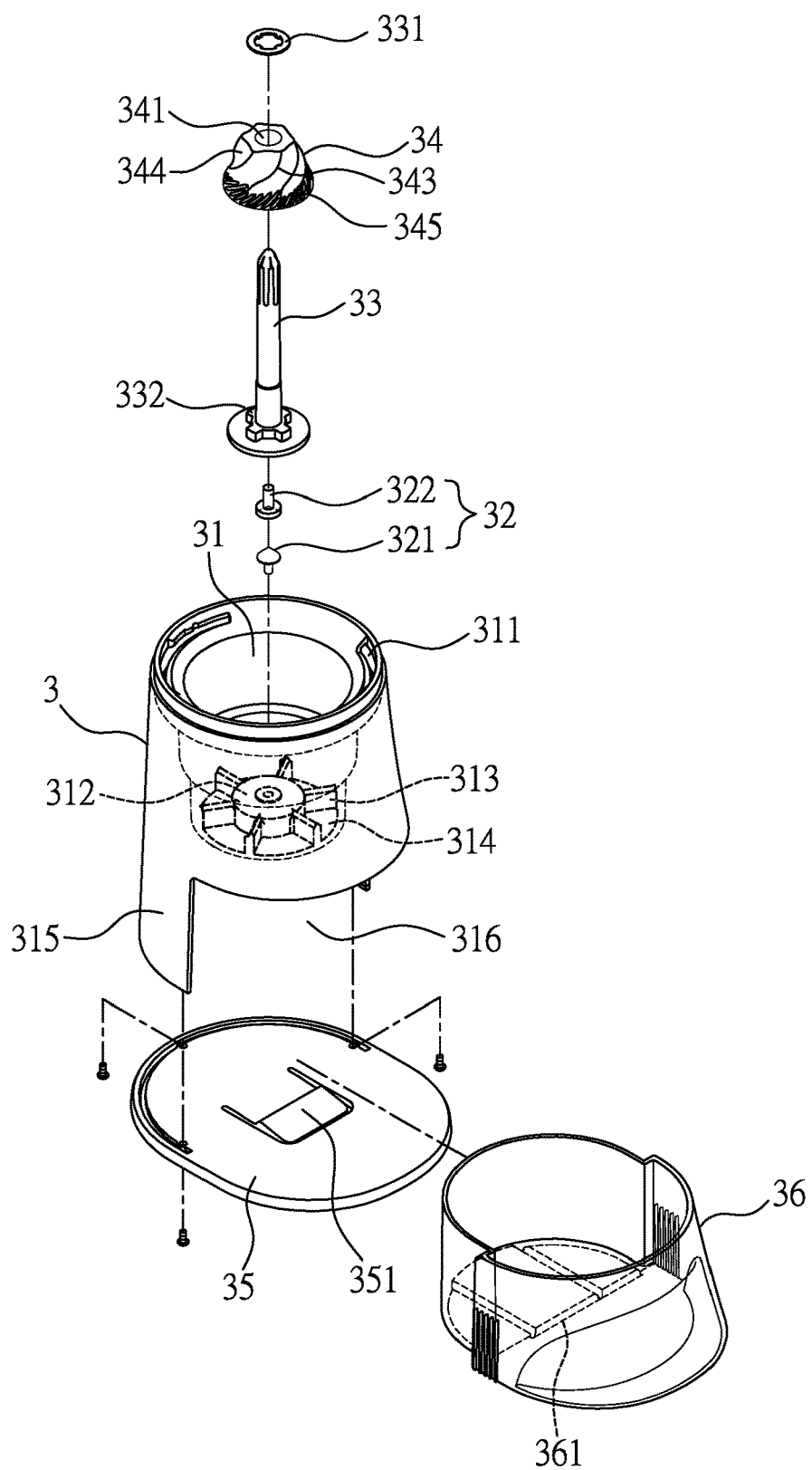
FIG. 3 is a perspective exploded view illustrating the base shown in FIG. 1 according to the present invention.
Figure 4:
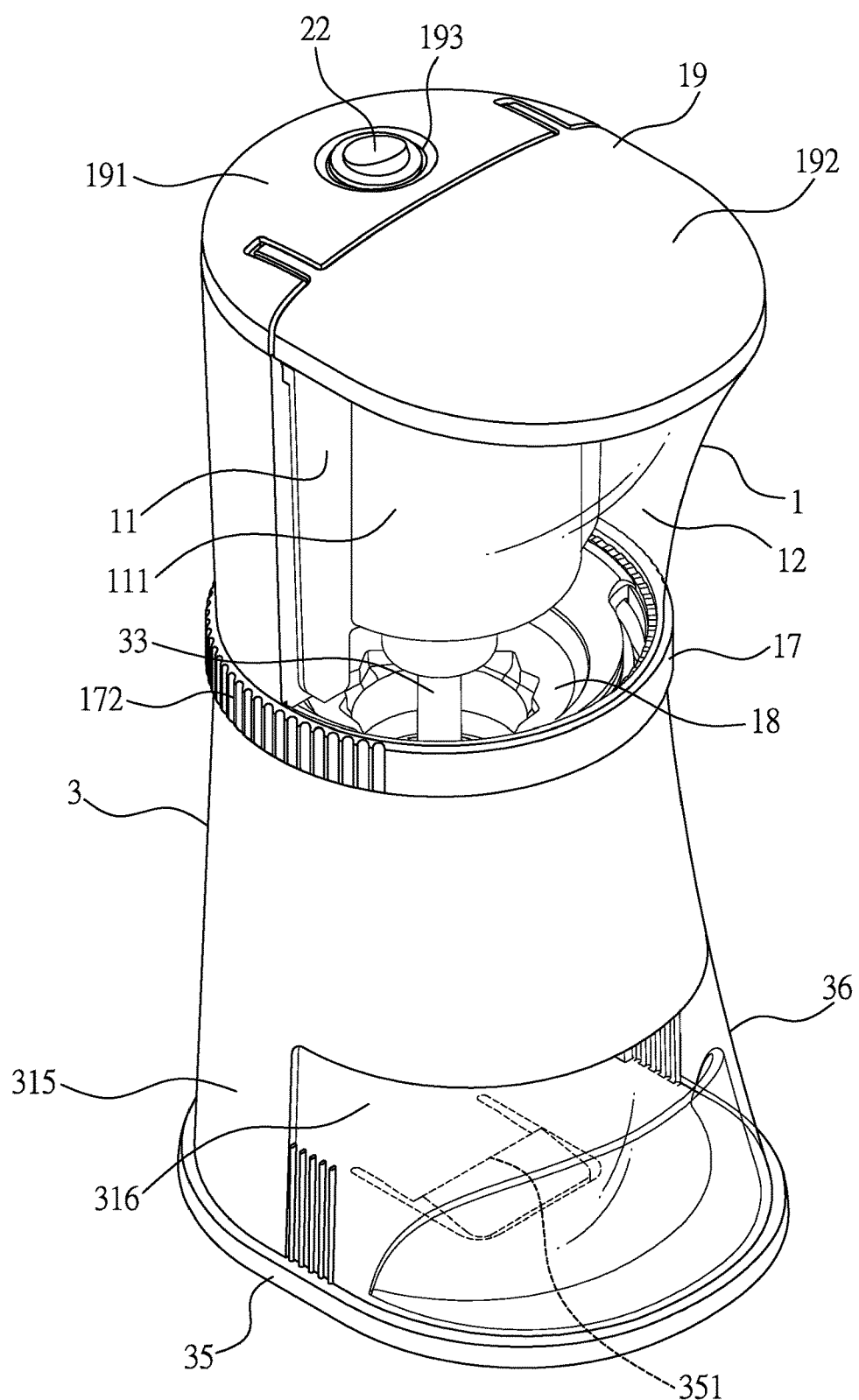
FIG. 4 is a perspective view illustrating the assembly of the grinder shown in FIG. 1 according to the present invention.

As shown in FIG. 1, FIG. 3 and FIG. 5, the base 3 includes a grinding chamber 31 in a hollow and stepped shape, the periphery defined on the top surface of the grinding chamber 31 is formed with at least two buckle slots 311 allowing the buckle hooks 123 to be inserted and buckled. The interior of the grinding chamber 31 is disposed with a support member 312, the outer circumference of the support member 312 is connected to an inner wall of the grinding chamber 31 through at least two wing sheets 313, at least one discharging port 314 is formed between the wing sheets 313, the top surface of the support member 312 is disposed with a pivotal shaft 32, the pivotal shaft 32 includes a conical core shaft 321 axially disposed on the top surface of the support member 312, and a shaft sleeve 322 having a conical recess allowing the core shaft 321 to be sleeved in and formed on the bottom surface of a passive rod 33. The core shaft 321 and the shaft sleeve 322 are made of an advanced ceramic material having properties of alkaline/acid resistant, wearing resistant and anti-oxidant, so that advantages of low friction, anti-oxidation and corrosion proof are provided.

After the passive rod 33 is sleeved with a conical grinding disk 34 which is linked with the passive rod 33, the top end and the bottom end of the passive rod 33 are respectively sleeved with the output shaft 23 and the pivotal shaft 32, thereby allowing the grinding disk 34 to protrude into the grinding seat 14 and forming a gap between the above two. As such, the passive rod 33 is able to be rotated with the output shaft 23, and the grinding disk 34 can be synchronously driven to perform a grinding operation in the grinding seat 14.

Wherein, the center of the grinding disk 34 is formed with a disk hole 341 allowing the passive rod 33 to pass, and the passive rod 33 is sleeved with a buckle ring 331, thereby preventing the grinding disk 34 from being released from the passive rod 33. Wherein, adjacent surfaces defined on the bottom surface of the grinding disk 34 and the bottom end of the passive rod 33 are respectively formed with a sleeve slot 342 (as shown in FIG. 5) and a sleeve tenon 332 which are in a non-circular shape and capable of being mutually sleeved with each other, thereby allowing the passive rod 33 and the grinding disk 34 to form a linking relation. The top edge of the disk hole 341 is integrally and downwardly extended with a plurality of spiral disk pieces 343, and a plurality of spiral grooves 344 are formed between the plural disk pieces 343, so that the objects to be ground can be driven by the disk pieces 343 to downwardly slide along the spiral grooves 344 for being processed with a grinding operation through disk teeth 345 with a lot of inclined teeth compactly arranged and formed below the spiral grooves 344 and the grinding teeth 145 of the grinding seat 14.

Because the inner diameter of the grinding seat 14 is slightly smaller than the outer diameter defined at the bottom end of the grinding disk 34, the grinding disk 34 is prevented from fully entering the grinding seat 14, and a gap is constantly kept between the above two. When the grinding disk 34 is rotated, the objects to be ground are fallen between the disk pieces 343, and driven by the disk pieces 343 and the spiral grooves 344, and smashed by the disk teeth 345 and the grinding teeth 145, then the powders with different particle sizes are fallen along the gap formed between the above two.

The powders having the particle size smaller than the gap are able to pass the discharging port 314 and fall from the grinding chamber 31; and the powders having the particle size larger than the gap are continuously ground for obtaining the powders having even particle size. Wherein, the grinding seat 14 and the grinding disk 34 are made of an advanced ceramic material having properties of alkaline/acid resistant, wearing resistant and anti-oxidant, so a qualitative change with the objects to be ground can be avoided.

The circumference defined at the bottom end of the base 3 is axially extended with a partition rack 315, and the bottom surface of the partition rack 315 is combined, such as screwed, with one end of a bottom plate 35, thereby allowing the base 3 to be stably placed. An accommodation space 316 is formed between the bottom plate 35 and the discharging port 314 for allowing an accommodating container 36 to be disposed, so that the ground powders can be fallen from the discharging part 314 and accommodated in the accommodating container 36.

For preventing the accommodating container 36 from being fallen out from the accommodation space 316, adjacent surfaces of the above two are correspondingly formed with a latch column 361 and an elastic protruding hook 351 capable of being mutually buckled with each other, so that the accommodating container 36 can be tightly buckled in the accommodation space 316 even when an external force is not applied.

According to what has mentioned above, wherein FIG. 4 is a perspective view illustrating the assembly of the grinder according the second embodiment, and FIG. 5 is a cross sectional view illustrating the assembly of the grinder according to the second embodiment.

As shown in FIG. 5, when the particle size of powder is desired to be adjusted by the grinder, firstly a user uses one hand to hold the base 3 and uses the other hand to hold and rotate the rotation ring 172 disposed between the receiving container 1 and the base 3, the elevation ring 16 connected at the bottom end of the adjustment ring 17 is axially moved in the feeding port 122 along the adjustment ring 17, and the grinding seat 14, the fasten ring 15 and the material guiding ring 18 are synchronously driven to be axially moved towards upward/downward, so that the dimension of the gap between the grinding seat 14 and the grinding disk 34 is changed, thereby finishing the adjustment process. The feature of adjusting the particle size is that: the conventional grinder utilizes the grinding disk as a moveable member, and the grinder provided by the present invention utilizes the grinding seat 14 as a moveable member, and the grinding seat 14 is connected to the elevation ring 16, so that the grinding seat 14 is able to be moved towards upward/downward relative to the grinding disk 34 for changing the dimension of the gap between the above two, thus the particle sizes of the ground powders can be remained in an even status.

When a cleaning operation is desired to be processed, the top cover 19 and the seal cover 24 are firstly detached from the top end of the receiving container 1, the electric driving device 2 is removed, then the fasten ring 15 and the grinding seat 14 are detached from the elevation ring 16, and the receiving container 1 is separated from the base 3, the passive rod 33 disposed with the grinding disk 34 is removed, lastly the accommodating container 36 is removed from the bottom end of the base 3, so a detaching status of main components as shown in FIG. 1 is formed. At this moment, besides the electric driving device 2, the user can use water to clean most of the components, especially the grinding seat 14 and the grinding disk 34, so that problems of powder adhering and odor generating can be solved.

Referring from FIG. 6 to FIG. 10, which discloses another embodiment of the grinder provided by the present invention, the difference between this embodiment and the previous embodiment is that the seal cover is not provided, and the electric driving device 2 is directly combined in the accommodation space 13 with a rotating means; the same codes disclosed in this embodiment and the previous embodiment represent the same components; because this embodiment shares a lot of common components with the previous embodiment, only the differences between the two embodiment are illustrated.

Figures 7, 7A:
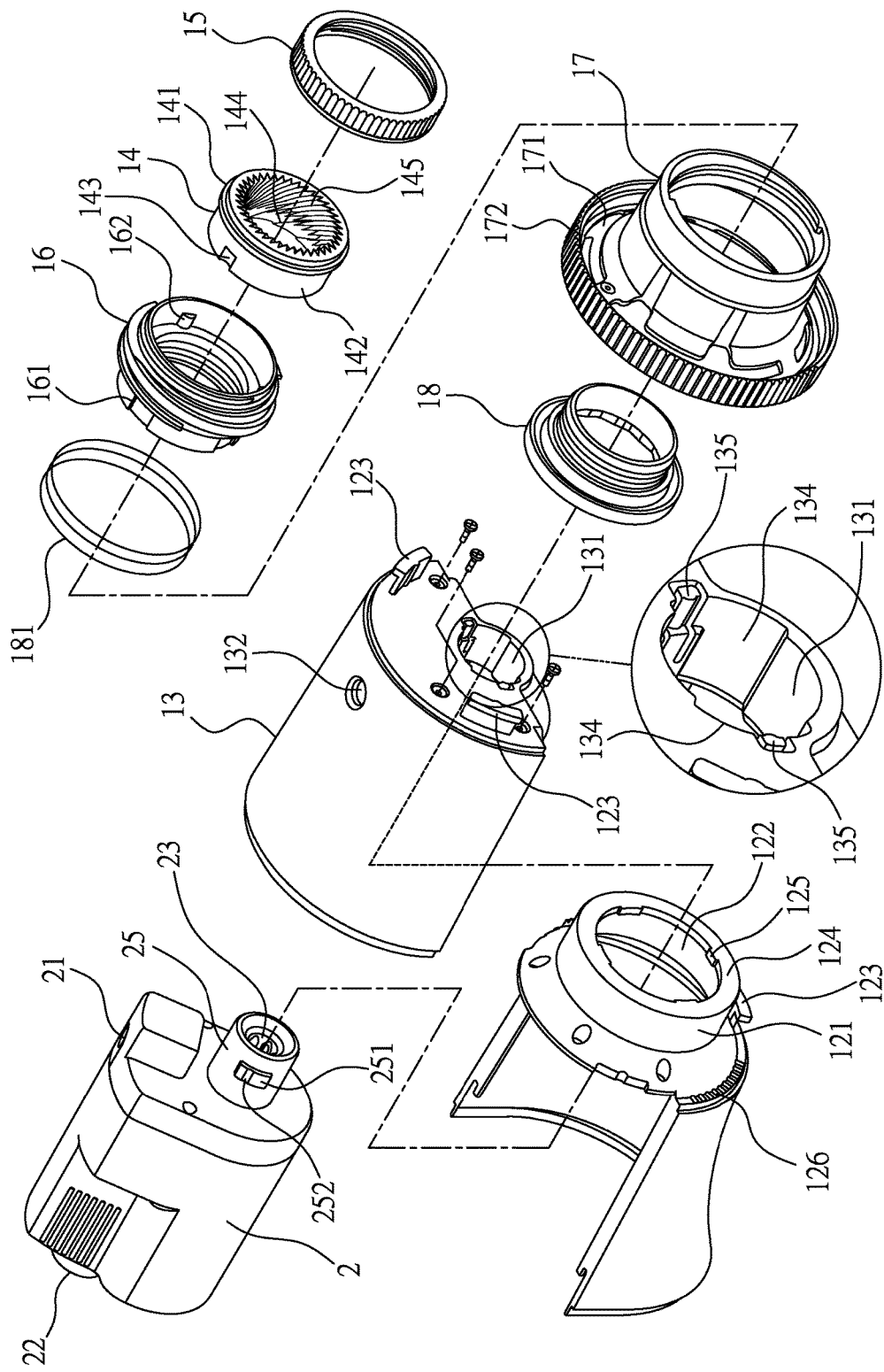
FIG. 7 is a perspective exploded view illustrating the receiving container and the electric driving device shown in FIG. 6 according to the present invention.
FIG. 7a is a partially enlarged view illustrating the bottom end of the receiving container shown in FIG. 7 according to the present invention.
Figure 8:
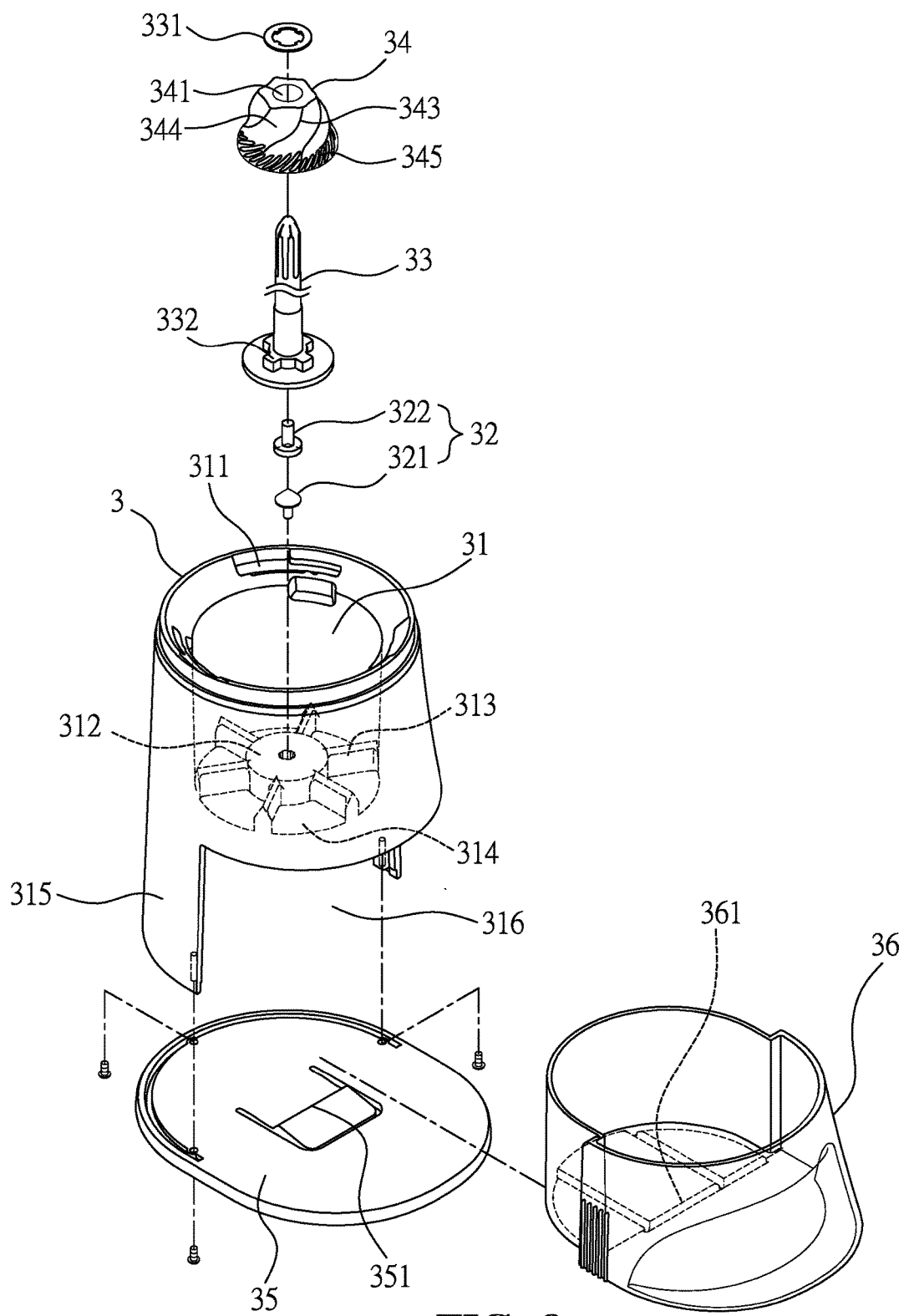
FIG. 8 is a perspective exploded view illustrating the base shown in FIG. 6 according to the present invention.
Figure 9:
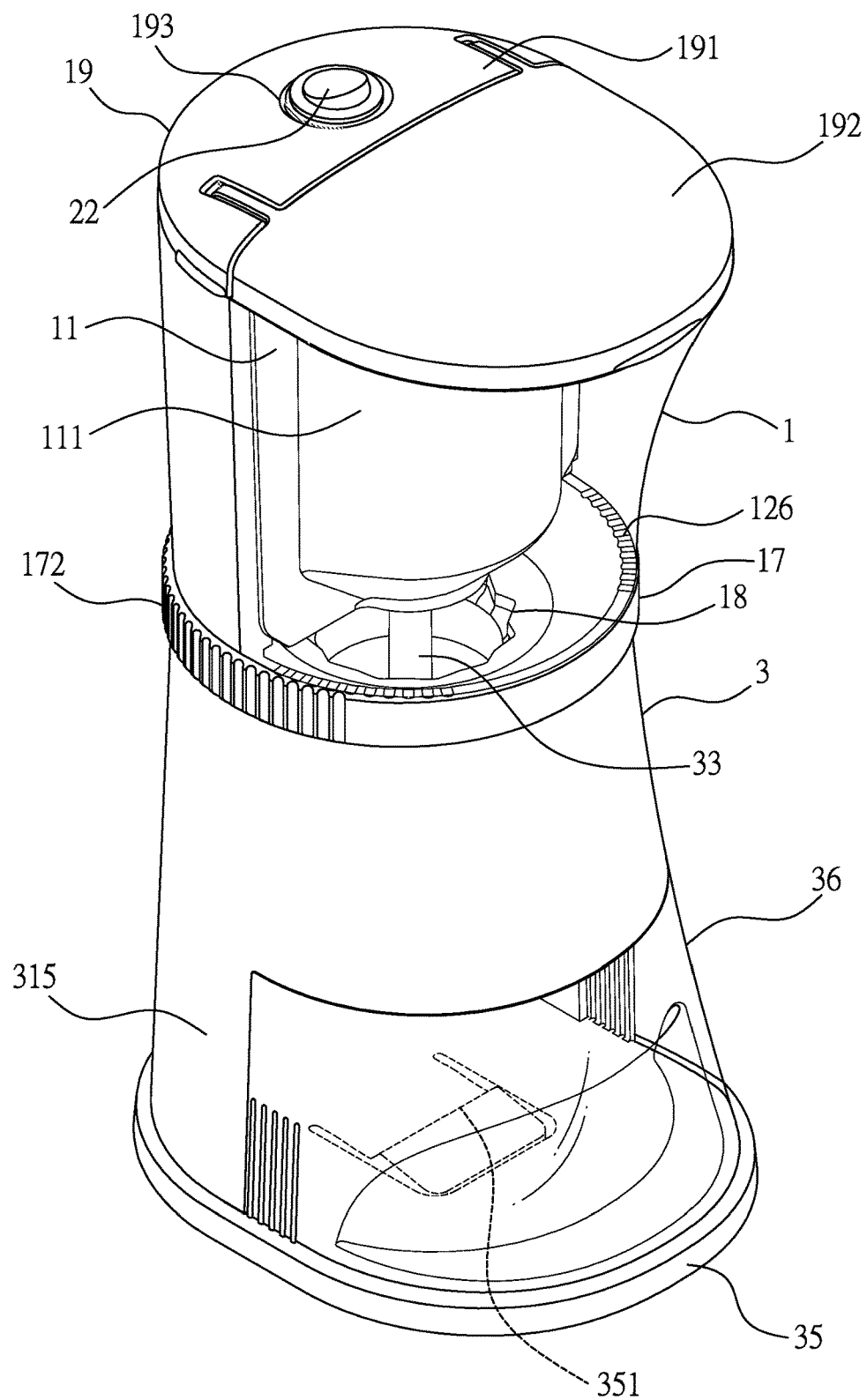
FIG. 9 is a perspective view illustrating the assembly of the grinder shown in FIG. 6 according to the present invention.
Figure 10:
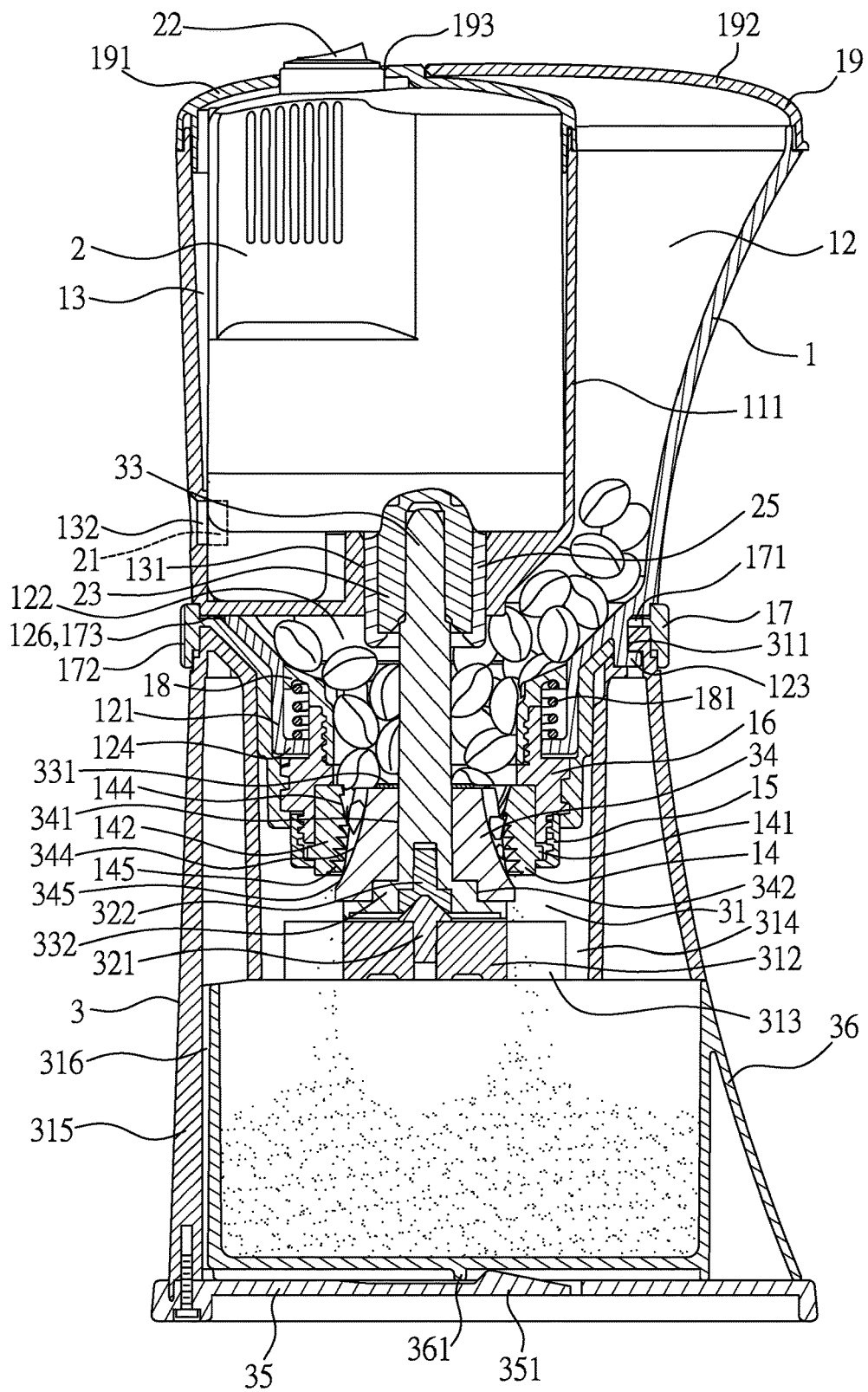
FIG. 10 is a cross sectional view illustrating the assembly of the grinder shown in FIG. 9 according to the present invention.

Besides the output shaft 23, the electric driving device 2 is additionally disposed with a connection column 25, in other words the connection columns 25 is served to enclose the output shaft 23. Wherein, the outer circumference of the connection column 25 is protrudingly formed with at least one latch tenon 251, and each of the latch tenons 251 is axially formed with a latch slot 252. The inner circumference of the through hole 131 is respectively formed with an L-shaped tenon slot 134 corresponding to each of the latch tenons 251, and the distal end of each of the tenon slots 134 is formed with an elastic tenon hook 135 (as shown in FIG. 7*a*) capable of being buckled in the latch slot 252. As such, when the electric driving device 2 is disposed in the accommodation space 13, the at least one latch tenon 251 of the connection column 25 is aimed at the at least one tenon slot 134 of the through hole 131 and inserted therein, then the electric driving device 2 is rotated, so that the latch slot 252 of each of the latch tenons 251 is able to be buckled with the elastic tenon hook 135 of each of the tenon slots 134, thereby preventing the electric driving device 2 from being axially fallen out from the accommodation space 13. At this moment, the power input socket 21 is rotated and aligned with the penetrated hole 132.

When a cleaning operation is desired to processed, the top cover 19 is firstly detached from the top end of the receiving container 1, the electric driving device 2 is reversely rotated for being removed from the accommodation space 13, then the fasten ring 15 and the grinding seat 14 are detached from the elevation ring 16, and the receiving container 1 is separated from the base 3, the passive rod 33 disposed with the grinding disk 34 is removed, lastly the accommodating container 36 is removed from the bottom end of the base 3, so a detaching status of main components as shown in FIG. 1 is formed. At this moment, besides the electric driving device 2, the user can use water to clean most of the components, especially the grinding seat 14 and the grinding disk 34, so that problems of powder adhering and odor generating can be solved.

Based on what has been disclosed above, advantages achieved by the present invention are as followings: through changing the space arrangement of the grinder, the electric driving device is able to be disposed in the receiving container, so the user can use his/her hands to detach and clean the grinder without the need of utilizing any tool, so that the problems of powder adhering and odor generating can be solved, the requirements of being hygienically and healthy can be satisfied, and the shortage of difficult to be detached and cleaned existed in the conventional electric grinder can be overcome; accordingly, the grinder provided by the present invention is novel and more practical in use comparing to prior art Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A grinder, comprising:
 a receiving container, having the interior thereof radially disposed with a partition plate for axially forming an accommodation space allowing objects to be ground to be accommodated and an installation space, wherein the bottom end of said receiving container is extended with a connection ring having a feeding port, and the bottom end of said installation space is formed with a through hole aligned with said feeding port; and an elevation ring connected to the bottom end of an adjustment ring, said adjustment ring is disposed with a rotation ring at the location adjacent to the bottom surface of said receiving container, said elevation ring is only able to be axially moved in said feeding port through being guided by a guiding mechanism, the bottom end of a material guiding ring is protruded from the bottom surface of said feeding port and connected to the top end of said elevation ring, a hollow grinding seat and a fasten ring are respectively and detachably disposed in said elevation ring and said connection ring;
 an electric driving device, detachably disposed in said installation space and including a power switch coupled to a power input socket, an output shaft is received in said through hole; and
 a base, detachably disposed at the bottom end of said receiving container and having a hollow grinding chamber, wherein the interior of said grinding chamber is disposed with a support member having the top surface formed with a pivotal shaft, said support member is connected to an inner wall of said grinding chamber through at least two wing sheets, and at least one discharging port is formed between said wing sheets, a passive rod is sleeved with a conical grinding disk linked with said passive rod, the top end and the bottom end of said passive rod are respectively sleeved with said output shaft and said pivotal shaft, thereby allowing said grinding disk to protrude into said grinding seat and forming a gap between said grinding disk and said grinding seat; said passive rod is able to be rotated with said output shaft, and said grinding disk is able to be synchronously driven to perform a grinding operation in said grinding seat; when said rotation ring is rotated, said elevation ring is axially moved along the bottom end of said adjustment ring, and said grinding seat, said fasten ring and said material guiding ring are synchronously driven to be moved towards upward/downward for adjusting the dimension of said gap.

2. The grinder as claimed in claim 1, wherein the circumference defined at the bottom end of said receiving container is radially protruded with at least two buckle hooks, said at least two buckle hooks are able to pass at least two seat slots preformed on the top surface of said adjustment ring then be inserted in and buckle with at least two buckle slots formed on the circumference defined on the top surface of said base.

3. The grinder as claimed in claim 1, wherein said guiding mechanism includes a plurality of guiding slots and a plurality of guiding columns correspondingly formed on the outer circumference defined at the top end of said elevation ring and the inner circumference defined on the bottom surface of said feeding port and capable of being mutually sleeved with each other.

4. The grinder as claimed in claim 1, wherein the bottom end of said material guiding ring is sleeved with an elastic member, said elastic member is disposed between said material guiding ring and the inner circumference defined on the bottom surface of said feeding port, and adjacent surfaces of said receiving container and said rotation ring are correspondingly disposed with a fixed teeth ring and a moveable teeth ring capable of being mutually engaged with each other.

5. The grinder as claimed in claim 1, wherein the bottom end of said grinding seat is formed with a seat edge abutted against said fasten ring, the top end of said seat edge is disposed with a grinding tube having a relatively smaller outer diameter, the outer circumference of said grinding tube and the inner circumference of said elevation ring are correspondingly formed with a plurality of positioning slots and positioning columns capable of being mutually inserted and positioned, and the top end defined on the inner circumference of said grinding tube is annularly formed with a plurality of inclined guiding ribs, and the bottom end thereof is annularly formed with a plurality of grinding teeth with a lot of inclined teeth compactly arranged; the center of said grinding disk is formed with a disk hole allowing said passive rod to pass, the top edge of said disk hole is integrally and downwardly extended with a plurality of spiral disk pieces, and a plurality of spiral grooves are formed between said plural disk pieces, and the bottom ends of said spiral grooves are formed with a plurality of disk teeth with a lot of inclined teeth compactly arranged.

6. The grinder as claimed in claim 5, wherein adjacent surfaces defined on the bottom surface of said grinding disk and the bottom end of said passive rod are respectively formed with a sleeve slot and a sleeve tenon which are in a non-circular shape and capable of being mutually sleeved with each other, thereby allowing said passive rod and said grinding disk to form a linking relation.

7. The grinder as claimed in claim 1, wherein said power input socket is disposed at the outer side of said electric driving device, and said installation space is formed with a penetrated hole corresponding to the location of said power input socket, and said power switch is disposed on the top surface of said electric driving device; and after said output shaft is decelerated, the rotation speed of said output shaft is between 70 to 90 RPM (revolution per minute).

8. The grinder as claimed in claim 1, wherein an opening at the top end of said receiving container is disposed with a top cover, and said top cover includes a fasten cover located above said electric driving device, said fasten cover is radially pivoted with a lift cover located above said accommodation space, and said fasten cover is formed with a cover hole corresponding to the location of said power switch and allowing said power switch to be exposed.

9. The grinder as claimed in claim 8, wherein said electric driving device further includes a seal cover which is detachable relative to said installation space, said seal cover is located below said fasten cover and formed with a key hole corresponding to the location of said power switch and allowing said power switch to be exposed, and adjacent surfaces of said electric driving device and the top end of said installation space are correspondingly formed with at least one latch hook and at least one latch slot capable of being mutually latched with each other, so that said seal cover is able to seal an opening at the top end of said installation space.

10. The grinder as claimed in claim 1, wherein the inner circumference of said through hole is formed with at least one tenon slot, said output shaft is enclosed by a connection column, and the outer circumference of said connection column is protrudingly formed with at least one latch tenon capable of being inserted in said at least one tenon slot and rotated so as to be positioned.

11. The grinder as claimed in claim 10, wherein the distal end of each of said tenon slots is formed with an elastic tenon hook, and each of said latch tenons is axially formed with a latch slot capable of being buckled with said elastic tenon hook.

12. The grinder as claimed in claim 1, wherein said pivotal shaft includes a conical core shaft axially disposed on the top surface of said support member, and a shaft sleeve having a conical recess allowing said core shaft to be sleeved in and formed on the bottom surface of said passive rod.

13. The grinder as claimed in claim 1, wherein the circumference defined at the bottom end of said base is axially extended with a partition rack, and the bottom surface of said partition rack is combined with a bottom plate, and an accommodation space allowing an accommodating container to be disposed is formed between said bottom plate and said discharging port.

* * * * *